US008725985B2

(12) United States Patent
Mothilal (10) Patent No.: US 8,725,985 B2
(45) Date of Patent: May 13, 2014

(54) LOGICAL-TO-PHYSICAL ADDRESS TRANSLATION FOR A REMOVABLE DATA STORAGE DEVICE

(71) Applicant: Imation Corp., Oakdale, MN (US)

(72) Inventor: Arunprasad Ramiya Mothilal, San Jose, CA (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/958,186

(22) Filed: Aug. 2, 2013

(65) Prior Publication Data

US 2013/0318362 A1 Nov. 28, 2013

Related U.S. Application Data

(63) Continuation of application No. 13/441,359, filed on Apr. 6, 2012, now Pat. No. 8,510,532, which is a continuation of application No. 12/426,917, filed on Apr. 20, 2009, now Pat. No. 8,176,295.

(51) Int. Cl.
*G06F 12/02* (2006.01)

(52) U.S. Cl.
USPC ........... 711/206; 711/103; 711/115; 711/203; 711/207

(58) Field of Classification Search
USPC .......................... 711/103, 115, 203, 206, 207
See application file for complete search history.

(56) References Cited

U.S. PATENT DOCUMENTS

| 5,341,339 | A | 8/1994 | Wells |
| 5,404,485 | A | 4/1995 | Ban |
| 5,479,638 | A | 12/1995 | Assar et al. |
| 5,937,425 | A | 8/1999 | Ban |
| 6,282,602 | B1 | 8/2001 | Blumenau et al. |
| 6,282,605 | B1 | 8/2001 | Moore |
| 7,096,313 | B1 | 8/2006 | Chang et al. |
| 7,120,729 | B2 | 10/2006 | Gonzalez et al. |
| 7,133,960 | B1 * | 11/2006 | Thompson et al. ............... 711/5 |
| 7,441,067 | B2 | 10/2008 | Gorobets et al. |
| 7,451,264 | B2 | 11/2008 | Yero |
| 7,594,062 | B2 | 9/2009 | In et al. |
| 7,797,481 | B2 | 9/2010 | Lee et al. |
| 2002/0129272 | A1 | 9/2002 | Terrell et al. |
| 2003/0130986 | A1 | 7/2003 | Tamer et al. |
| 2006/0069900 | A1 | 3/2006 | Powers et al. |
| 2007/0016756 | A1 | 1/2007 | Hsieh et al. |
| 2007/0028033 | A1 | 2/2007 | Hsieh et al. |
| 2007/0038802 | A1 | 2/2007 | Tsai et al. |
| 2007/0294490 | A1 | 12/2007 | Freitas et al. |
| 2008/0063210 | A1 * | 3/2008 | Goodman et al. ............ 380/286 |
| 2009/0094409 | A1 | 4/2009 | Yeh et al. |
| 2009/0259819 | A1 | 10/2009 | Chen et al. |
| 2010/0023675 | A1 | 1/2010 | Chen et al. |
| 2010/0115186 | A1 | 5/2010 | Chang et al. |
| 2010/0161880 | A1 | 6/2010 | You |
| 2010/0185805 | A1 | 7/2010 | Chen et al. |
| 2010/0268865 | A1 | 10/2010 | Mothilal |

* cited by examiner

*Primary Examiner* — Jae Yu
(74) *Attorney, Agent, or Firm* — Dorsey & Whitney LLP (57) ABSTRACT

A method for making memory more reliable involves accessing data stored in a removable storage device by translating a logical memory address provided by a host digital device to a physical memory address in the device. A logical memory address is received from the host digital device. The logical memory address corresponds to a location of data stored on the removable storage device. A physical memory address corresponding to the local address is determined by accessing a lookup table corresponding to the logical zone.

18 Claims, 6 Drawing Sheets

LOGICAL-TO-PHYSICAL ADDRESS TRANSLATION FOR A REMOVABLE DATA STORAGE DEVICE

CROSS-REFERENCE TO RELATED APPLICATION

The present application is a continuation of U.S. patent application Ser. No. 13/441,359, filed Apr. 6, 2012, now U.S. Pat. No. 8,510,532, which is a continuation of U.S. patent application Ser. No. 12/426,917 filed Apr. 20, 2009, now U.S. Pat. No. 8,176,295, which is related to U.S. patent application Ser. No. 12/426,924, filed Apr. 20, 2009 and entitled "Static Wear Leveling," each of which is incorporated herein by reference.

BACKGROUND OF THE INVENTION

1. Field of the Invention

The present invention relates generally to removable data storage devices. More specifically, the present invention relates to logical-to-physical address translation for a removable data storage device.

2. Related Art

In various types of memory, such as NAND flash, for example, reliability problems arise. As such, there is a need for a method and system for making memory, such as NAND flash, more reliable.

SUMMARY OF THE INVENTION

Embodiments of the present invention allow for making memory, such as NAND flash, for example, more reliable. Embodiments involve the accessing of data stored in a removable storage device by translating a logical memory address provided by a host digital device to a physical memory address in the removable storage device. Some of the data in the removable storage device is encrypted in one embodiment.

In a first claimed embodiment, a method is disclosed for making memory more reliable and for accessing encrypted data stored in a removable storage device by translating a logical memory address provided by a host digital device to a physical memory address in the removable storage device. The method includes receiving a logical memory address from the host digital device, the logical memory address corresponding to a location of encrypted data stored on the removable storage device. The method further includes determining a logical zone of memory on the removable storage device, the logical zone corresponding to the logical memory address. Additionally, the method includes determining a local address within the logical zone of memory on the removable storage device, the local address within the logical zone corresponding to the logical memory address. The method also includes determining a physical memory address corresponding to the local address by accessing a lookup table corresponding to the logical zone. The method still further includes determining a decryption key corresponding to the encrypted data stored at the physical memory address. The method further includes decrypting the encrypted data stored at the physical memory address using at least the decryption key to produce decrypted data. The method also includes transmitting the decrypted data to the host digital device.

In a second claimed embodiment, a method is disclosed for making memory more reliable and for accessing encrypted data stored in a removable storage device by translating a logical memory address provided by a host digital device to a physical memory address in the removable storage device. The method includes receiving a logical memory address from the host digital device, the logical memory address corresponding to a location of encrypted data stored on the removable storage device. The method also includes determining a logical zone of memory on the removable storage device, the logical zone corresponding to the logical memory address. The method further includes determining a local address within the logical zone of memory on the removable storage device, the local address within the logical zone corresponding to the logical memory address. The method still further includes creating a lookup table in random access memory coupled with a processor of the removable storage device based on memory map data stored in flash memory corresponding to the logical zone, the flash memory coupled with the processor. The method also includes determining a physical memory address corresponding to the local address within the logical zone by accessing the lookup table in random access memory. The method further includes determining a decryption key corresponding to the encrypted data stored at the physical memory address. The method still further includes decrypting the encrypted data stored at the physical memory address using at least the decryption key to produce decrypted data. Additionally, the method includes transmitting the decrypted data to the host digital device.

In a third claimed embodiment, a removable storage device configured for making memory more reliable is set forth. The removable storage device includes a flash memory that includes a plurality of non-volatile memory storage blocks. The removable storage device includes a processor coupled with the flash memory and configured to read data from and write data to the non-volatile memory storage blocks. The removable storage device further includes a communications interface coupled with the processor and configured to communicate the data to and from a host digital device. The removable storage device additionally includes a memory having stored thereon firmware executable by the processor to perform a method. The method includes receiving a logical memory address from the host digital device, the logical memory address corresponding to a location of encrypted data stored on the removable storage device. The method further includes determining a logical zone of memory on the removable storage device, the logical zone corresponding to the logical memory address. The method also includes determining a local address within the logical zone of memory on the removable storage device, the local address within the logical zone corresponding to the logical memory address. The method further includes creating a lookup table in random access memory coupled with a processor of the removable storage device based on memory map data stored in flash memory corresponding to the logical zone, the flash memory coupled with the processor. The method further includes determining a physical memory address corresponding to the local address within the logical zone by accessing the lookup table in random access memory. The method still further includes determining a decryption key corresponding to the encrypted data stored at the physical memory address. The method also includes decrypting the encrypted data stored at the physical memory address using at least the decryption key to produce decrypted data. Additionally, the method includes transmitting the decrypted data to the host digital device.

DETAILED DESCRIPTION OF EXEMPLARY EMBODIMENTS

Systems and methods are described for logical-to-physical address translation for a data storage device. The data storage can be a portable and/or removable data storage device, or other storage device. In exemplary embodiments, the data storage device can be removably and/or communicatively coupled with a host computer system. Embodiments relate to secure storage of data for access by a computer operating system, such as Windows®, when a computer running the computer operating system is communicatively coupled with the portable data storage device. It is noteworthy that the data storage device need not be portable or removable in various embodiments according to the present invention. For example, the data storage device could be a disc drive in a computer or other device.

In various embodiments, the portable data storage device may include one or more physical memory integrated circuits or chips. The physical memory chips may include NAND flash, NOR flash, or other nonvolatile memory (NVM) technologies. The portable data storage device includes electronic circuitry, a processor, and/or firmware configured to map a logical memory address space to one or more physical memory chips such that each logical memory address within the logical memory address space might map to a single physical memory location of an equal memory capacity. In some embodiments, the physical memory chips have a larger total memory capacity combined than the logical memory address space to allow for some amount of defective or otherwise nonfunctional physical memory.

Figure 1:
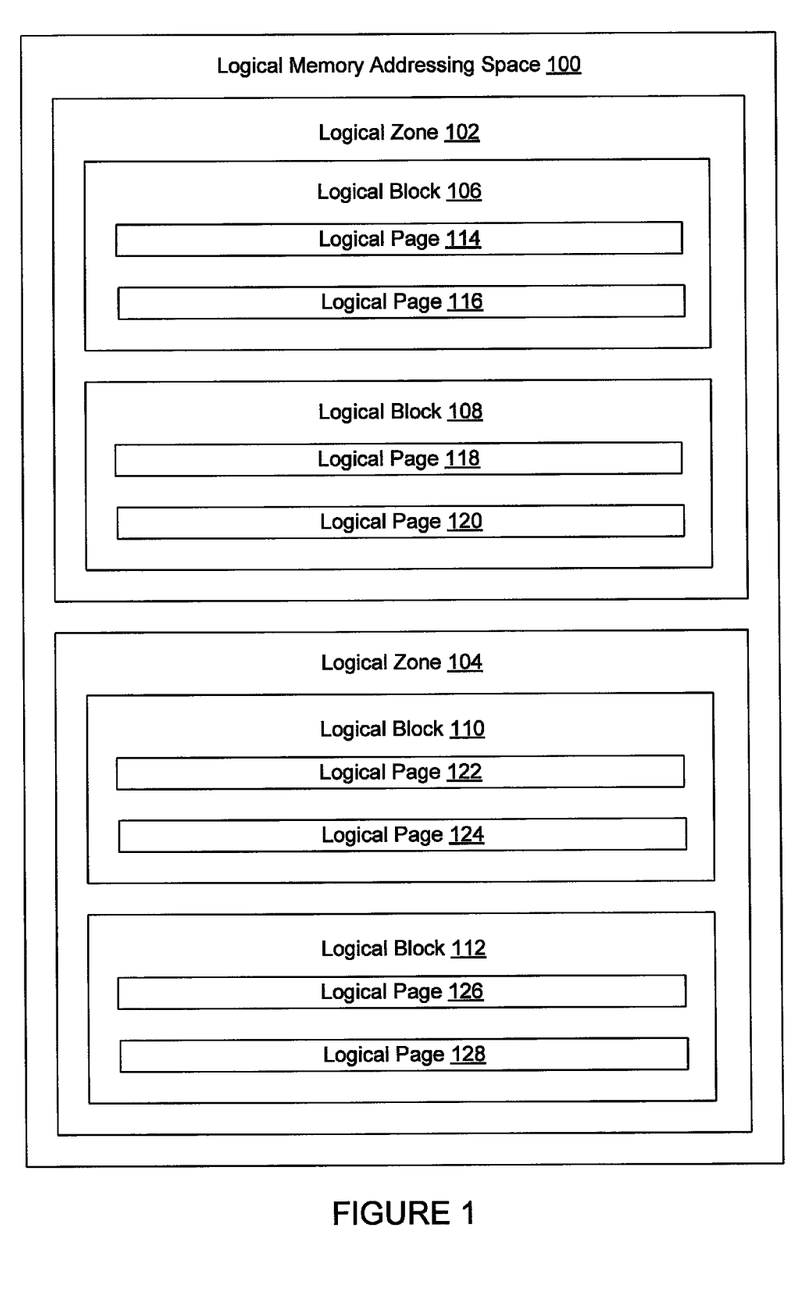
FIG. 1 is an illustration of an exemplary logical memory addressing scheme.

FIG. 1 is an illustration of an exemplary logical memory addressing scheme. A logical memory addressing space 100 comprises a plurality of logical zones including logical zones 102 and 104. The logical memory addressing space 100 may have a maximum data storage capacity which is divided among the plurality of logical zones. In some embodiments, the maximum data storage capacity may be divided equally among the plurality of logical zones.

Each logical zone may include a plurality of logical blocks, such as logical blocks 106 to 108, or logical blocks 110 to 112. For example, a logical zone may include 512 logical blocks. Some logical blocks included within the logical zone may be utilized as spare blocks to replace other blocks. Additionally, some logical blocks included within the logical zone may be utilized for storage of address translation lookup tables or implementation of data storage management functions. Therefore, the actual number of logical blocks that may store data within the logical zone may be a smaller number, such as 500 logical blocks or fewer. However, it is also contemplated that a greater number of logical blocks can be included according to exemplary embodiments of the present invention.

Figure 2A:
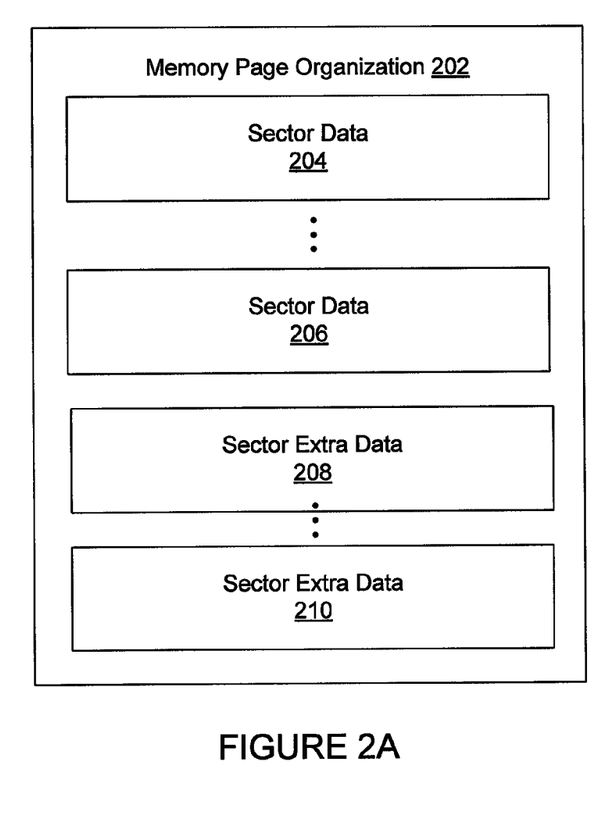
FIG. 2A is an illustration of an exemplary memory page organization.

FIG. 2A is an illustration of an exemplary memory page organization 202. In the memory page organization 202, a plurality of data sectors from sector data 204 to sector data 206 are mapped adjacent to one another within the memory address space corresponding to the page. Following the last of the plurality of data sectors, extra data corresponding to each of the data sectors from sector extra data 208 to sector extra data 210 are mapped adjacent to one another within the remainder of the memory address space corresponding to the page. Because the memory page includes extra data corresponding to each data sector, the total sum of data stored in the data sectors within the memory address space corresponding to the page might be less than the total memory capacity of the page.

In an embodiment according to the present technology, a data sector might have a memory capacity of 512 bytes. In alternative embodiments, the memory can be larger or smaller. There can also be 16 bytes of extra data associated with the data sector. In alternative embodiments, the extra data can have more or fewer bytes, and can include parity bytes, the IV, BL0 and BL1. Therefore, if a page includes eight sectors of data, the page might have a total data storage capacity of 4096 bytes and a total memory capacity of 4224 bytes.

In various embodiments, the extra data associated with each data sector might include data bits allocated to parity checking or forward error correction (FEC) of memory stored within the data sector. For example, the extra data might include 10 bytes of storage capacity for a four-symbol FEC of the data stored in the sector. In alternate embodiment, more or less storage capacity can be used. It is contemplated that BCH or various other error correction algorithms can be used. The extra data might also include information regarding the how the data sector is utilized by the removable data storage device and the type of data stored in the data sector. The extra data can be used to create a logical-to-physical address translation table, or a lookup table.

Figure 2B:
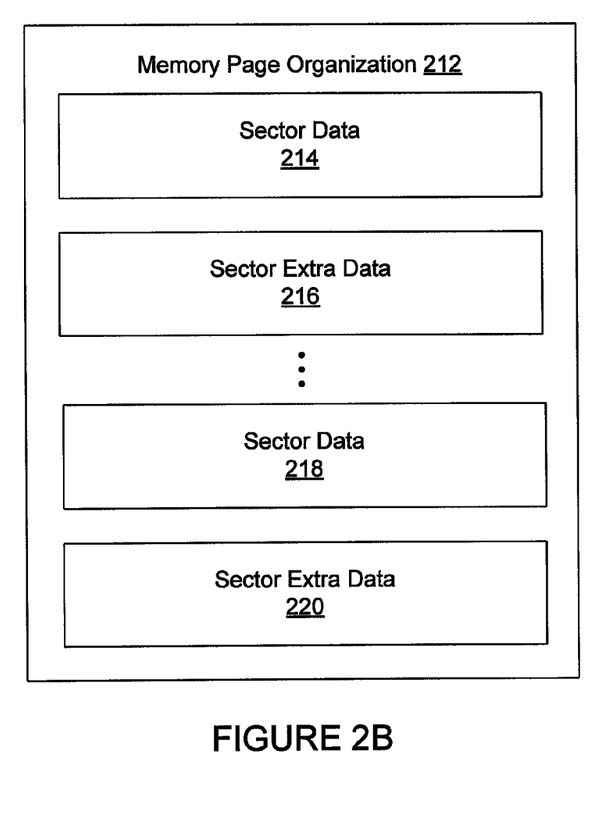
FIG. 2B is an illustration of an exemplary alternative memory page organization.

FIG. 2B is an exemplary illustration of an alternative memory page organization 212. In the memory page organization 212, a plurality of pairs of data sectors and extra data sectors are mapped adjacent to one another. More particularly, sector data 214 is mapped adjacent to sector extra data 216 within the memory address space corresponding to the page. Similarly, sector data 218 is mapped adjacent to sector extra data 220.

Figure 3:
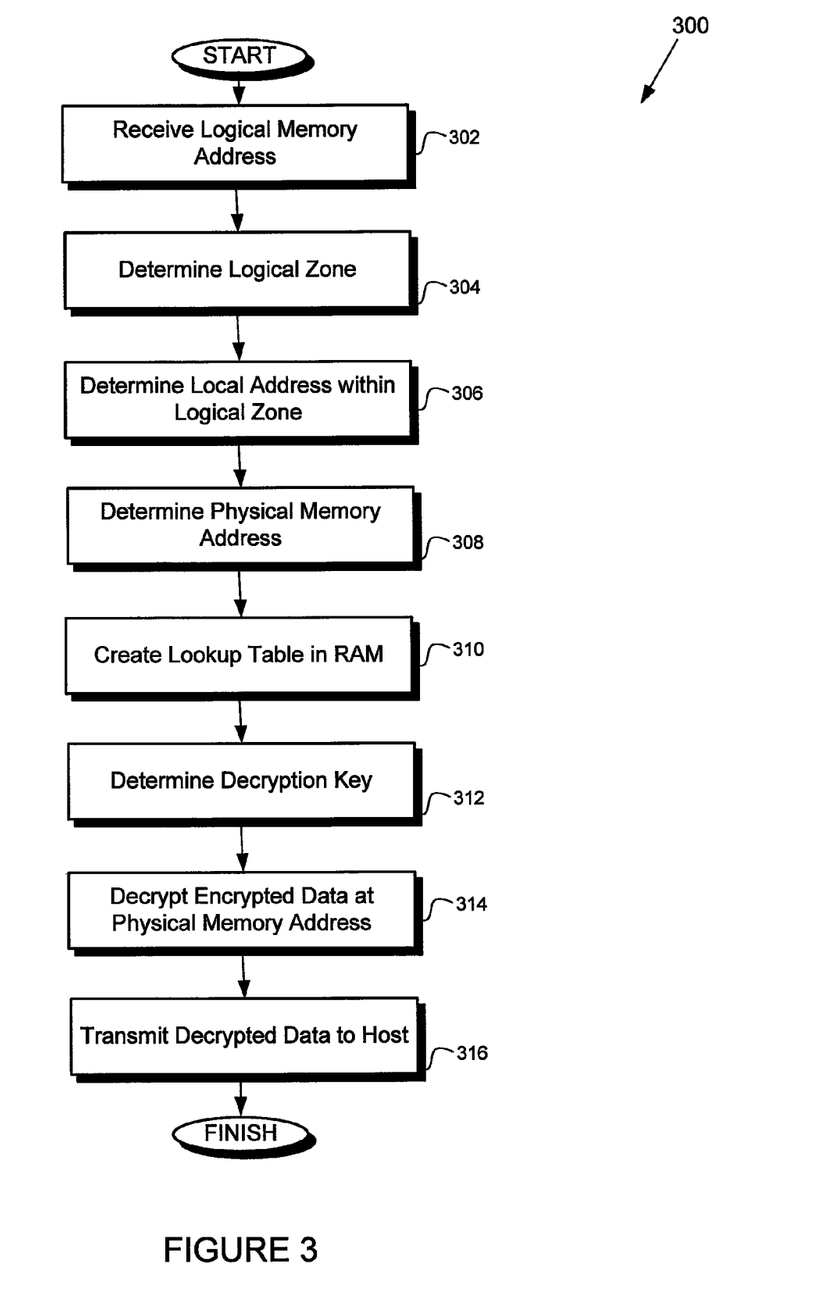
FIG. 3 is a flowchart illustrating an exemplary method of accessing encrypted data stored in a removable storage device.

FIG. 3 is a flowchart illustrating an exemplary method 300 of accessing encrypted data stored in a removable storage device. The method for accessing encrypted data stored in a removable storage device may include translating a logical memory address provided by a host digital device to a physical memory address in the removable storage device.

The removable data storage device may include multiple logical volumes when communicatively coupled with a host computer system. A first logical volume can be a read-only volume, which the host computer system may recognize or functionally interact with as a CD-ROM drive. A second logical volume can be a read/write removable data storage volume. In some embodiments, the read/write removable data storage volume includes a secured volume such that the host computer system is not granted access to the secured volume until the secured volume is unlocked. The secured volume may be considered locked until a user enters an appropriate password into a security software application configured to control access to the secure volume, for example. In one embodiment, the security software application includes a control panel application for the removable data storage device.

In step 302, a logical memory address is received from the host digital device or any other type of suitable device. The logical memory address may correspond to a location of encrypted data stored on the removable storage device. In one embodiment, receiving a logical memory address from the host digital device comprises receiving one or more read/write commands. In one embodiment one or more read/write commands can be implemented. These can be SCSI read/write commands or other commands, in various embodiments.

In step 304, a logical zone of memory on the removable storage device is determined. The logical memory address is analyzed to determine the logical zone that corresponds to the logical memory address. In one embodiment, firmware can identify the logical zone number and the residual number of the incoming commands.

A local address within the logical zone of memory on the removable storage device is determined in step 306. The local address within the logical zone may correspond to the logical memory address. For example, the local address may be an offset from the first logical address within a range of addresses included within the logical zone. In this example, the local address may be determined by subtracting the first logical address within the range of addresses included within the logical zone from the logical memory address.

In step 308, a physical memory address is determined. In one embodiment, a physical memory address corresponding to the local address within the logical zone is determined by accessing the lookup table in RAM. In one embodiment, the lookup table is in RAM of the device. In another embodiment, the lookup table is in RAM of the host.

In one embodiment, the lookup table corresponds to the logical zone. The physical memory address corresponding to the local address within the logical zone might correspond to a different flash memory chip than a physical memory address corresponding to a different local address within the logical zone.

In step 310, a lookup table is created in RAM. The current logical zone information is saved from a table buffer. The current LTB and MLTB status is then updated. MLTB is a master lookup table block. LTB is a lookup table block, and holds the lookup table for the logical zone.

It is noteworthy that the lookup table can include address translation between logical memory addresses received from the host digital device and physical memory addresses corresponding to the non-volatile memory chips within the removable storage device.

In one embodiment according to aspects of the present invention, two copies of a lookup table block (LTB0, LTB1) are set aside for a given logical zone. The LTB of the selected logical zone is stored in a table buffer area of RAM for speed optimization.

The LTB status is handled as follows, in one embodiment. When the device is provisioned or when the device is completely up-to-date and at rest, LTB0 can be active and LTB1 can be inactive, or vice-versa. When the device is accidentally removed or when the device is accessing the current logical zone, LTB0 can be inactive and LTB1 can be inactive.

In keeping with embodiments according to the present invention, when the firmware begins accessing a logical zone, it flips the active bit to inactive and accesses the logical zone. When it changes to another logical zone, then firmware updates the logical zone and sets the corresponding LTB entry to active. If the user unplugs the device before making LTB update, then both LTBs would be inactive and firmware will rebuild the logical-to-physical table if it encounters LTB0 and LTB1 inactive.

In one embodiment, a provisioning or manufacturing tool first writes MLTB, LTB0, and LTB1. In another embodiment, firmware can create default states by writing MLTBs and LTBs.

Next, when firmware accesses a new logical zone (e.g. the firmware switches from logical zone X to logical zone Y), it saves the current logical zone X LTB data and changes its LTB state in the MLTB from inactive to active.

The firmware subsequently loads a new logical zone Y to the table buffer, and flips the corresponding LTB from active to inactive in the MLTB. If the access switched to a new logical zone, then the procedure gets repeated from the point in the procedure where the firmware accesses a new logical zone. If a user unplugs the device or a surprise removal of the device from the host occurs in-between, the firmware knows from its MLTB status that both LTB0 and LTB1 are inactive and indicates the firmware to rebuild the table, as mentioned herein. In one embodiment, upon a sudden loss of power, the system loses at least the latest updated logical-to-physical table buffer.

Upon power on, firmware checks whether both LTBs are invalid. If both LTBs are invalid for a logical zone, then firmware picks one invalid LTB of the corresponding logical zone from MLTB information and reconstructs the updated logical-to-physical lookup table. In the case of a partial write, the firmware may identify the multiple physical blocks for a given logical block. The firmware can then reconstruct the logical block.

From the master lookup table block, the firmware knows the invalid LTB. In one embodiment, the firmware reads the old invalid LTB into a temporary buffer in order to identify the chip select, zone number, and physical block numbers of the 512 blocks in the LTB.

The LTB is then rebuilt by scanning those physical blocks. This is noteworthy because the firmware doesn't have any idea about the physical location of the logical block. The logical block can be across zones or chips, etc.

In some embodiments, a lookup table corresponding to only one logical zone may be stored in RAM at a time. In one embodiment, creating the lookup table in RAM is responsive to determining that a lookup table previously stored in the flash memory corresponding to the logical zone is invalid.

If a lookup table corresponding to a different logical zone than the logical zone corresponding to the current logical memory address is presently stored in RAM, the processor may save the lookup table to non-volatile memory and then create the new lookup table. If the lookup table corresponding to the current logical memory address is already stored in RAM, then the processor might skip step 310.

The non-volatile memory chips might be communicatively coupled with a processor of the removable storage device. The lookup table can be created based on memory map data stored in the flash memory corresponding to the logical zone.

In one embodiment according to aspects of the present invention, a table buffer rebuild process includes several steps. First, the appropriate inactive logical zone's lookup table buffer is loaded to another buffer. Next, firmware reads BL0:BL1. These are block status bytes that hold a block type, logical-to-physical information, and a decryption key. In one embodiment, this is accomplished using four-byte logical block address (LBA) cluster block information (i.e. chip select number, zone number, and physical block number). Subsequently, with BL0:BL1 information, firmware can re-establish the table buffer.

In one embodiment, the flash memory is communicatively coupled with the processor. It is contemplated that the processor might allocate two kilobytes of data for the lookup table, in one embodiment. Alternatively, other amounts of data greater or fewer than two kilobytes can be allocated.

The lookup table might include one entry per block in the logical zone. The entry might include some information bits that provide status information pertaining to the block. These information bits may include whether the block has been assigned as a memory block or whether the block is currently a spare block, whether the block is defective or otherwise nonfunctional, whether the block contains an active or inactive lookup table, or whether the block contains a master lookup table. The entry may also include a number of times that the block has been erased. The entry may also include physical address information for the physical memory in which the block is stored, such as a chip select number, a physical zone number, and a physical block number.

There may be two copies of the lookup table for each logical zone stored in physical non-volatile memory. A status of each copy of the lookup table may be marked as active or inactive. Normally, one copy is marked active while the other copy is marked inactive. Typically, when a logical zone is accessed, the lookup table in NVM corresponding to the logical zone is marked as inactive.

When a different logical zone than one corresponding to the present logical memory address is accessed, or the removable data storage device is properly decoupled from the host digital device, the lookup table presently in RAM is written to NVM in place of one of the copies. In various embodiments, RAM can be located on the host and/or the device. When the lookup table is written to NVM, the written lookup table is marked as active, while the copy is marked as inactive. If both copies are marked inactive, data stored within the lookup tables may no longer be accurate. This inaccuracy may be due to the removable data storage device being removed from the host digital device prematurely or incorrectly. If both copies are found to be marked inactive, a new lookup table may be created in RAM by analyzing the two inactive lookup tables corresponding to the logical zone as well as extra data corresponding to the data sectors within the blocks of the logical zone.

In one embodiment, one or more copies of a master lookup table may be stored on a block within the logical memory addressing space 100. The master lookup table is a table indicating where all the lookup tables for all of the logical zones are. This information can be stored in one place. However, it is contemplated that this information could be stored in more than one place in alternative embodiments.

The firmware can access the master lookup table in order to determine where the lookup tables of the logical zones are. Then the firmware can access the lookup tables of the logical zones. Based on their status, the system can make a decision. If one of the lookup tables is marked active then it can be used. If they are both marked inactive then the lookup tables should be created again from scratch. The system then creates them.

In one embodiment, there are two copies of the lookup table. There are also two copies of each of these lookup tables for each logical zone, in one embodiment.

In one embodiment, there are two copies of the MLTB designated MLTB 00 and MLTB 01. These two copies exist at the final chip select, and the manufacturing (MFG) or provisioning tool provides the whereabouts of the MLTB $00^{th}$ physical block number and chip select number.

Upon doing a power cycle, firmware identifies the MTB block area and makes it ready for flash input/output (I/O) operation. In order to minimize the erase cycle, firmware can hit an erase command when it runs out of free pages in the LBA cluster block. The MLTB block gets updated when there is a change in the following parameters: (1) active/inactive LTB status; (2) average LTB erase count; and/or (3) LTB erase multiplication factor.

In one method according to exemplary embodiments, a typical MLTB 00 update sequence might include several steps. First, the current MLTB 00 is read to a buffer, say, Buffer2. Next, new data is updated onto Buffer2. Then the firmware then determines if free page availability is found in MLTB 00.

If free page availability is found in MLTB 00, then new data is updated onto a new page in MLTB 00. If free page availability is not found in MLTB 00, then MLTB 00 is erased and the system restarts from the first page.

Subsequently, MLTB 00 is erased and new data is updated onto a new page in MLTB 00. MLTB 01 is also erased, and new data is updated onto a new page in MLTB 01.

The master lookup table might include one entry per logical zone. Each entry of the master lookup table might include an address for the lookup table, the average erase count for the lookup table, and a cycle count for the lookup table indicating how many times the average erase count has been reset. The master lookup table can be stored in a consistent place on the physical non-volatile memory so that it may be readily accessed without address translation. For example, the one or more copies of the master lookup table may be stored at the last physical zone of the last chip select number.

In keeping with embodiments according to the present invention, if the firmware encounters an error during erase or write operations, it marks the block as bad. The firmware then and makes an entry in the LTB so that the block will not be used in the future.

Turning to step 312, a decryption key is determined. The decryption key corresponds to the encrypted data stored at the physical memory address. In one embodiment, the decryption key is determined by accessing the lookup table in RAM. The decryption key can be determined according to a range of logical memory addresses corresponding to the logical zone. In one embodiment, the decryption key corresponding to the encrypted data stored at the physical memory address is different than a decryption key corresponding to encrypted data stored at another physical memory address to which the logical zone corresponds. In one embodiment, the physical memory address corresponding to the local address within the logical zone corresponds to a different flash memory chip than a physical memory address corresponding to a different local address within the logical zone.

In step 314, the encrypted data stored at the physical memory address is decrypted. This is accomplished using at least the decryption key to produce decrypted data.

In step 316, the decrypted data is transmitted to the host digital device.

In one exemplary embodiment, a method for logical-to-physical address translation, or mapping, can be summarized. First, the host issues SCSI read/write commands. As mentioned herein, the read/write commands do not have to be SCSI read/write commands. Next, firmware identifies the incoming commands' logical zone number and the residual number. The current logical zone information is then saved from a table buffer, and the current LTB and MLTB statuses are updated. Subsequently, the incoming logical zone's LTB is moved to the table buffer and the MLTB status is updated. Next, using the residual number and logical indexing, firmware picks up the exact chip select, physical zone and physical block number. Firmware then calculates a starting physical address. Subsequently, firmware loads the physical address to hardware registers and enables data transfer.

Figure 4:
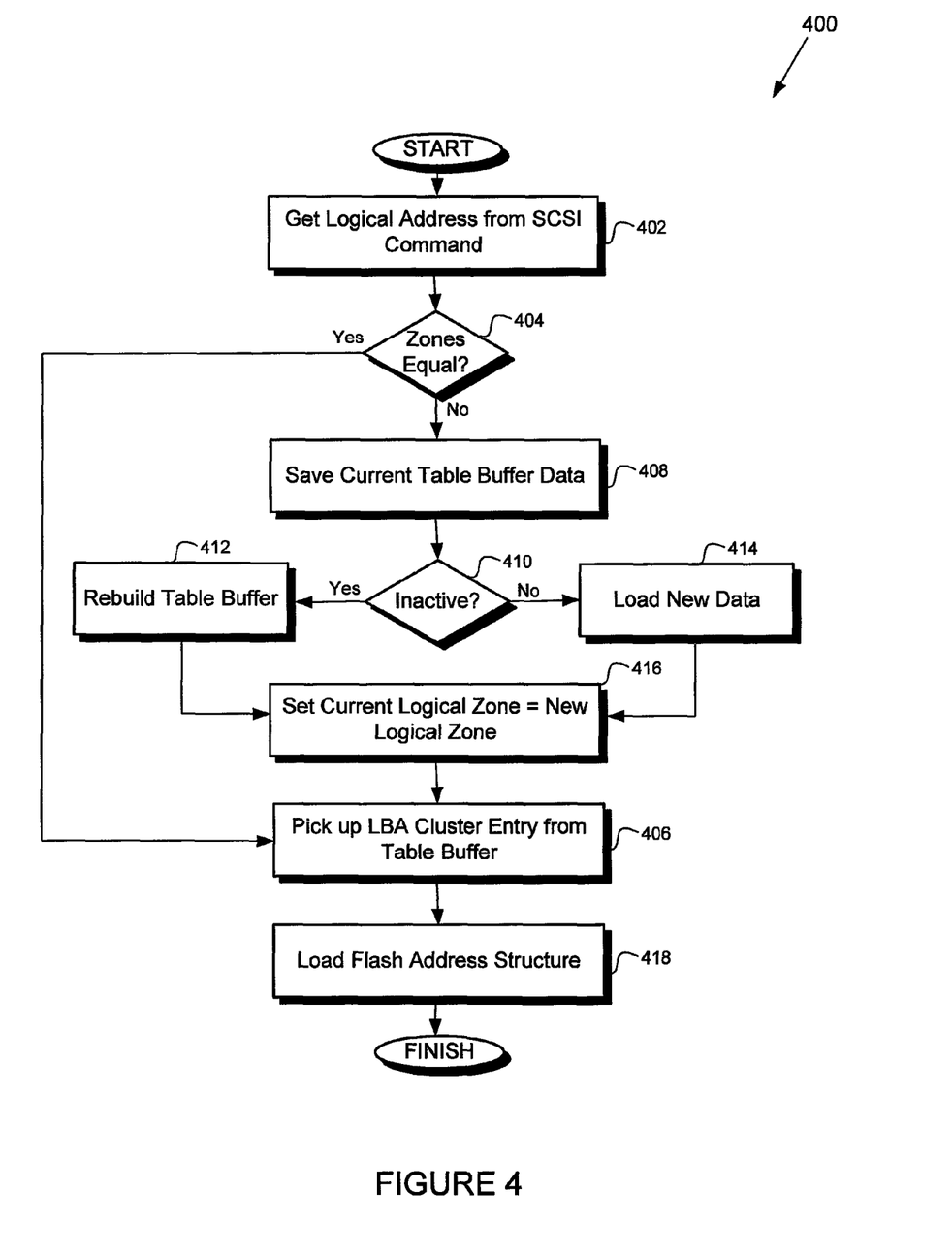
FIG. 4 is a flowchart illustrating an exemplary method of managing master table lookup blocks and lookup table blocks during logical zone changes.

FIG. 4 is a flowchart of an exemplary method 400, illustrating a typical logical-to-NAND-physical address translation, according to one exemplary embodiment. FIG. 4 illustrates one way that the MLTB and LTBs might be managed during logical zone changes. It is contemplated that other technology than NAND may be implemented in various embodiments according to the present invention.

In step 402, the system gets the logical address from a SCSI command. The new logical zone is calculated. The logical offset for the incoming logical address is also calculated.

In decision step 404, if the current logical zone is equal to the new logical zone then the process proceeds to step 406. If the current logical zone is not equal to the new logical zone, then the process proceeds to step 408.

In step 408, the current table buffer data is saved to the current logical zone lookup table block, and its status is updated from inactive to active. The process then proceeds to decision step 410.

In decision step 410, if both lookup table block statuses for the new logical zone are inactive, then the process proceeds to step 412. If both lookup table block statuses for the new logical zone are not inactive, then the process proceeds to step 414.

In step 412, the table buffer is rebuilt. This rebuild, described herein, can be accomplished using inactive lookup table block data. The process then proceeds to step 416.

In step 414, new logical zone lookup table data is loaded to the table buffer. Its MTB status is updated from active to inactive. The process then proceeds to step 416.

In step 416, the current logical zone is set equal to the new logical zone. The process then proceeds to step 406.

In step 406, using logical offset, the LBA cluster entry is picked up from the table buffer.

In step 418, from the LBA cluster entry from the table buffer, the flash address structure is loaded with the exact NAND physical address and chip selection.

In one embodiment, a key can be assigned to each LBA range. It is contemplated that each key can be unique.

Figure 5:
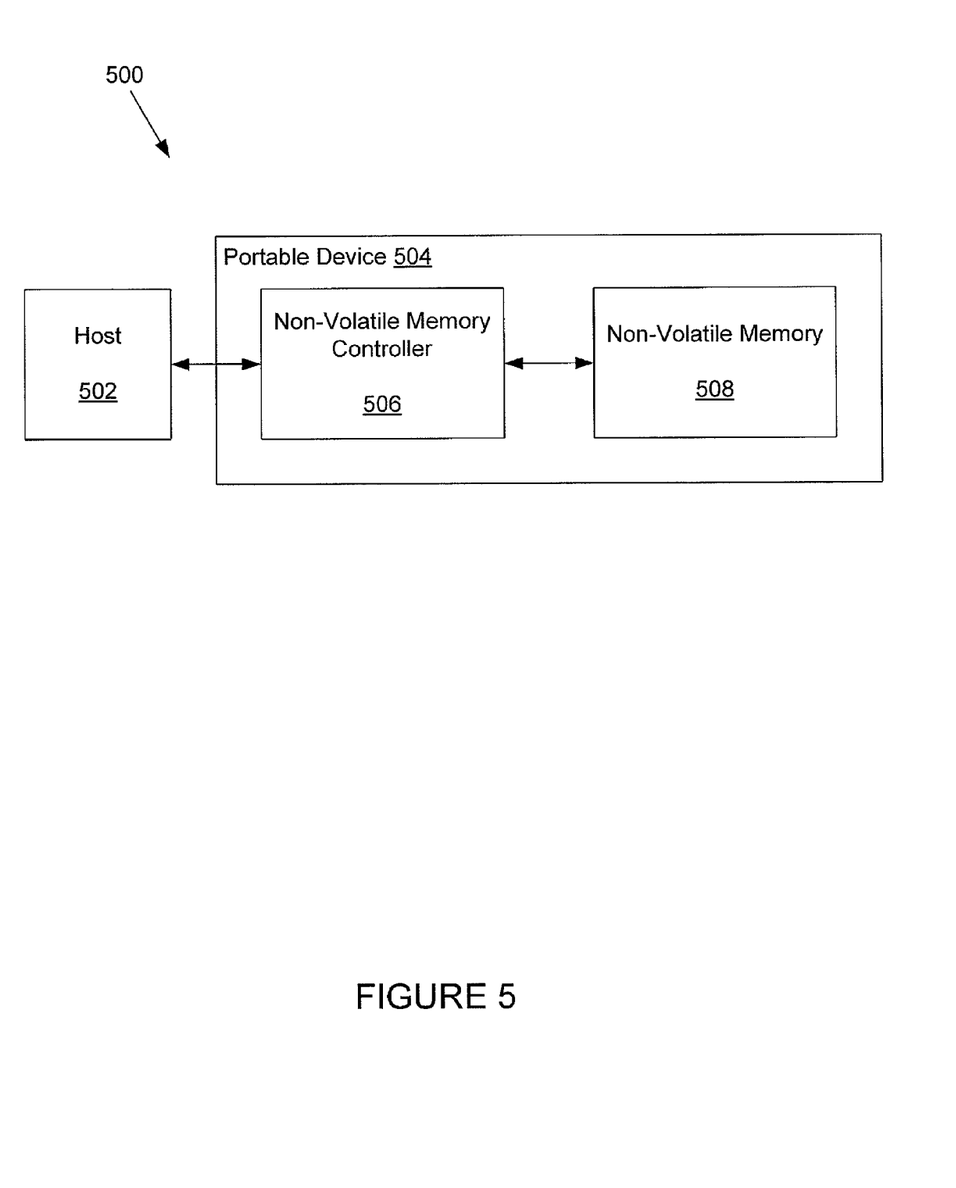
FIG. 5 is an exemplary block diagram of a system including a host and a portable data storage device.

FIG. 5 illustrates an exemplary block diagram of a system 500 employing embodiments of the present invention. As depicted, the system 500 includes a host 502 in communication with a portable device 504, which in turn includes a non-volatile memory controller 506 and non-volatile memory 508. In alternative embodiments, the host 502 and the portable device 504 may be combined into a single device.

The host 502 may be any device that can interface with a removable data storage device such as portable device 504. Examples of the host 502 may include personal computers, personal digital assistants (PDAs), and various other computing devices. Examples of the host 502 may also include printers, digital cameras, scanners, and other devices that may store and retrieve data from the portable device 504. Many of these examples may have a software-based or firmware-based operating system that sends write commands to the portable device 504.

The portable device 504 may include any device that includes non-volatile memory in which stored information is retained whether or not the portable device 504 is powered. An example of the portable device 504 is a removable data storage device. For illustrative purposes, non-volatile memory is discussed herein in the context of flash memory. Flash memory is used in a number of applications such as universal serial bus (USB) flash drives and various memory cards. Flash memory may also be used in personal digital assistants (PDAs), laptop computers, digital audio players, digital cameras, and mobile phones. The portable device 504 may be communicatively coupled with the host 502 either physically or wirelessly.

The non-volatile memory controller 506 might include a small microcontroller. The non-volatile memory controller 506 might also include some amount of on-chip ROM and/or RAM. The non-volatile memory controller 506 might include software and/or firmware that may execute various modules described herein. As such, the non-volatile memory controller 506 can function as an intermediary between the host 502 and the non-volatile memory 508. The non-volatile memory controller 506 can comprise one or more integrated circuits configured to provide the functionality of the non-volatile memory controller 506.

The non-volatile memory 508 can include any type of memory that may be electrically erased and rewritten such as NAND flash and NOR flash. The non-volatile memory 508 can comprise other memory technologies as they become available. NAND flash technologies include single-level cell (SLC) and multi-level cell (MLC) technologies. Typically, SLC NAND may have a longevity of approximately 100,000 write cycles, while MLC NAND may have a longevity of approximately 1,500 write cycles. SLC is typically faster and more reliable than MLC NAND technologies.

The non-volatile memory 508 can include a plurality of physical memory chips. Each physical memory chip might be individually addressable using a chip select. In an exemplary embodiment, the portable device 504 can include N physical memory chips, with each physical memory chip assigned a unique chip select value from 0 to N−1. In some embodiments, N may range from 1 up to 8. It is also contemplated that N can be greater than 8.

NAND flash physical memory chips can typically be organized by memory blocks, memory pages, and memory sectors. In some embodiments, a NAND flash physical memory chip may have two kilobytes or four kilobytes of data storage capacity per page, and 64 or 128 pages per block. A NAND flash physical memory chip might also support multi-plane or multi-plane multi-chip memory addressing functionality. Multi-plane memory addressing functionality can enable two NAND physical memory blocks to represent a single logical block, whereas multi-plane multi-chip memory addressing functionality can enable four NAND physical memory blocks to represent a single logical block.

Accordingly, a data storage capacity of a single logical block may equal up to four NAND physical memory blocks. Multi-plane memory addressing functionality might include a dual-channel configuration, in which a single physical memory address is allocated across two physical memory chips with one physical memory chip representing the most significant byte (MSB) of the physical memory address, while the second physical memory chip represents the least significant byte (LSB) of the physical memory address. A dual-channel configuration may have double the memory capacity compared to a single-channel configuration.

Figure 6:
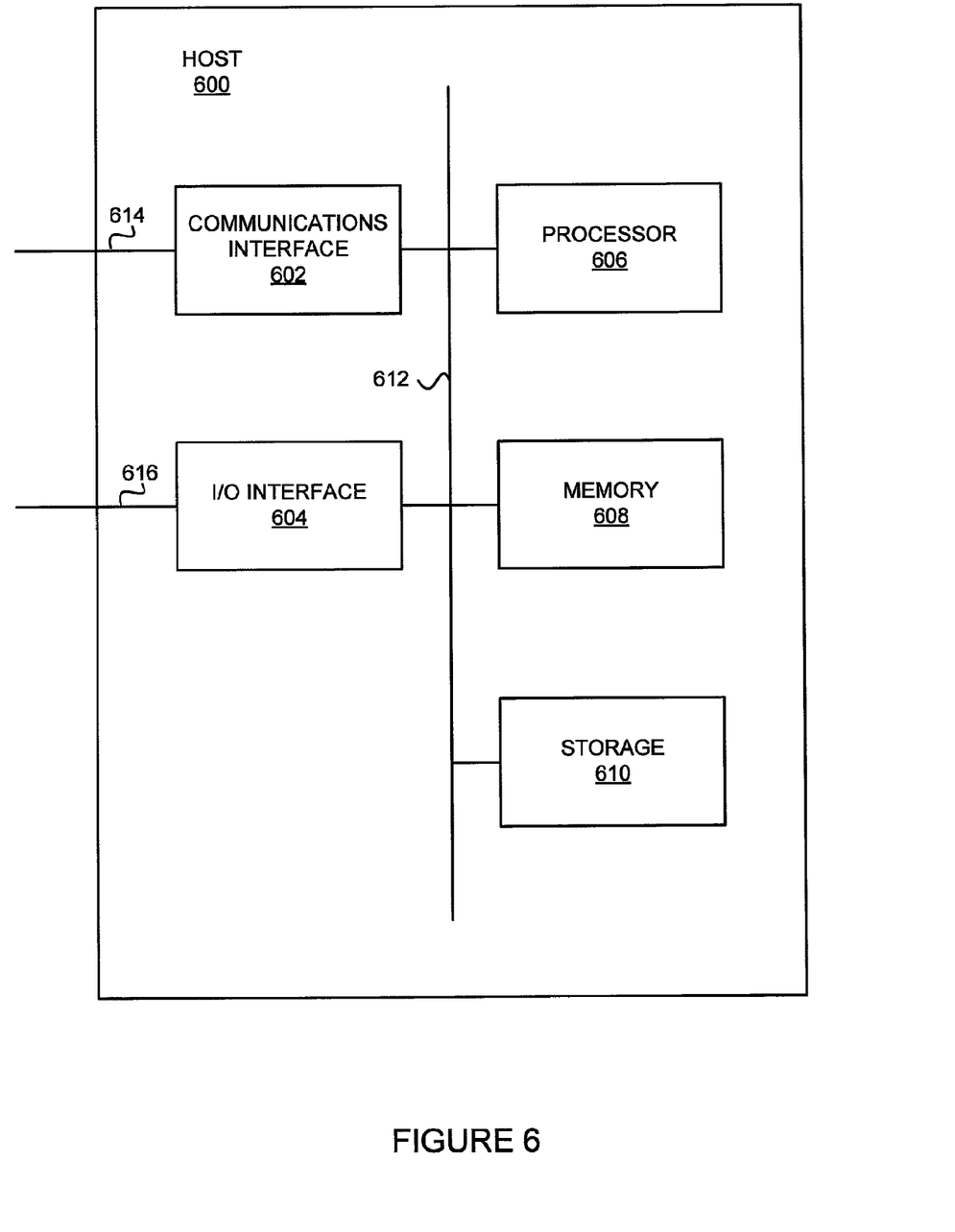
FIG. 6 is an exemplary block diagram of a host including a processor, memory, storage, a communications interface, an input/output interface, and a bus.

FIG. 6 illustrates an exemplary host 600. In one embodiment, the host 600 comprises at least a processor 606, a memory 608, and a storage 610, which are communicatively coupled with a bus 612. The host 600 can also comprise a communications interface 602 and an I/O interface 604. The communications interface 602 may couple with a network via a network communications medium 614. The bus 612 provides communications between the communications interface 602, the processor 606, the memory 608, the storage 610, and the I/O interface 604.

The processor 606 executes instructions. The memory 608 permanently or temporarily stores data. Some examples of the memory 608 are RAM and ROM. The storage 610 can include a hard disk, a compact disc (CD), a digital video disc (DVD), a floppy disk, or a flash memory card. The I/O interface 604 can include any device that can receive input and provide output to a user. The I/O interface 604 can include, but is not limited to, an interface to a keyboard, a mouse, a video monitor, a touchscreen, a keypad, or a biosensor. The I/O interface 604 might also communicate with a removable data storage device, such as the portable device 504 via an I/O communications medium 616. Examples of the I/O communications medium 616 include a USB cable, a FireWire cable, an eSATA cable, and free space for wireless communications such as WiFi and Bluetooth. In some embodiments, the host 600 comprises a graphical user interface to be displayed to a user over a video monitor in order to allow the user to control the host 600.

The embodiments discussed herein are illustrative. As these embodiments are described with reference to illustrations, various modifications or adaptations of the methods and/or specific structures described may become apparent to those skilled in the art.

The above-described modules can be comprised of instructions that are stored on storage media (e.g., computer readable storage media). The instructions may be retrieved and executed by a processor (e.g., the processor 606). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A removable storage device comprising:
   memory configured to store encrypted data at a physical memory address in the removable storage device;
   a processor coupled with the memory, the processor configured to:
   receive a logical address from a host device;
   identify a logical zone of the memory corresponding to the logical address;
   determine a local address within the logical zone, the local address corresponding to the logical address;
   determine the physical memory address corresponding to the local address by accessing a stored lookup table corresponding to the logical zone; and
   decrypt the encrypted data using a decryption key corresponding to the encrypted data stored at the physical memory address in the removable storage device, wherein the decryption key is different from a decryption key corresponding to encrypted data stored at another physical memory address to which the logical zone corresponds in the removable storage device;
   wherein different decryption keys correspond to encrypted data stored at physical memory addresses in the removable storage device corresponding to different local addresses within the identified logical zone of the memory in the removable storage device; and
   an interface coupled with the processor, the interface configured to communicate the decrypted data to the host device.

2. The device of claim 1, wherein a unique decryption key is assigned to each of a plurality of ranges of logical addresses within the logical zone.

3. The device of claim 1, wherein the processor is configured to determine the decryption key by accessing the stored lookup table corresponding to the logical zone.

4. The device of claim 2, wherein the processor is configured to create a new lookup table corresponding to the logical zone if a lookup table corresponding to a different logical zone is presently stored.

5. The device of claim 1, wherein the physical memory address identifies one of a plurality of memory chips corresponding to the logical zone.

6. The device of claim 5, wherein physical memory addresses corresponding to different local addresses within the logical zone correspond to different memory chips in the memory of the removable storage device.

7. The device of claim 1, wherein the processor is configured write the stored lookup table to a copy in non-volatile memory of the storage device when a different logical zone is accessed.

8. The device of claim 1, wherein the processor is configured to write the stored lookup table to a copy in non-volatile memory of the storage device when decoupled from the host device.

9. A removable storage device comprising:
   memory configured to store encrypted data at a physical memory address in the removable storage device;
   a memory controller coupled with the memory, the memory controller configured to:
   receive a logical address from a host device, the logical address mapping to the physical memory address of the encrypted data in the removable storage device;
   identify a logical zone of the memory corresponding to the logical address;
   determine a local address within the identified logical zone, the local address corresponding to the logical address;
   determine whether a stored lookup table corresponding to the identified logical zone is invalid, and, responsive thereto, reconstruct the lookup table;
   determine the physical memory address corresponding to the local address by accessing the lookup table; and
   decrypt the encrypted data using a decryption key corresponding to the encrypted data stored at the physical memory address in the removable storage device;
   wherein different decryption keys correspond to encrypted data stored at physical memory addresses in the removable storage device corresponding to different local addresses within the identified logical zone of the memory in the removable storage device; and
   an interface coupled with the memory controller, the interface configured to communicate the decrypted data to the host device.

10. The device of claim 9, wherein the different decryption keys are uniquely determined for each of a plurality of ranges of logical addresses within the identified logical zone.

11. The device of claim 9, wherein the memory controller is configured to create a new lookup table corresponding to the logical zone if a lookup table corresponding to a different logical zone is presently stored.

12. The device of claim 9, wherein the memory controller is configured to create the lookup table in random access memory and to store two copies of the lookup table in non-volatile memory of the storage device.

13. The device of claim 12, wherein the memory controller is configured to write the lookup table from the random access memory in place of one of the two copies in non-volatile memory, the one copy being marked active and the other copy being marked inactive.

14. A removable storage device comprising:
   memory configured to store encrypted data at a physical memory address in the removable storage device;
   a controller coupled with the memory, the controller configured to:
      receive a logical address from a host device, the logical address mapping to the physical memory address of the encrypted data in the removable storage device;
      identify a logical zone of the memory corresponding to the logical address;
      determine a local address within the logical zone, the local address corresponding to the logical address;
      in response to determining that a presently stored lookup table corresponds to a different logical zone, create a lookup table corresponding to the logical zone based on memory map data stored in the memory;
      determine the physical memory address corresponding to the local address by accessing the lookup table corresponding to the logical zone; and
      decrypt the encrypted data using a decryption key corresponding to the encrypted data stored at the physical memory address in the removable storage device;
      wherein different decryption keys correspond to encrypted data stored at physical memory addresses in the removable storage device corresponding to different local addresses within the identified logical zone of the memory in the removable storage device; and
   an interface coupled with the controller, the interface configured to communicate the decrypted data to the host device.

15. The device of claim 14, wherein the different decryption keys are uniquely determined for each of a plurality of ranges of logical addresses within the logical zone.

16. The device of claim 14, wherein the controller is configured to reconstruct the lookup table corresponding to the logical zone in response to determining that a previously stored lookup table corresponding to the logical zone is invalid.

17. The device of claim 14, wherein the controller is configured to write the lookup table corresponding to the logical zone in place of a copy stored in non-volatile memory of the removable storage device, when a different logical zone is accessed.

18. The device of claim 17, wherein the copy of the lookup table in the non-volatile memory is marked as active, wherein and the controller is configured to store another copy marked as inactive.

* * * * *

UNITED STATES PATENT AND TRADEMARK OFFICE
CERTIFICATE OF CORRECTION

| | |
|---|---|
| PATENT NO. | : 8,725,985 B2 |
| APPLICATION NO. | : 13/958186 |
| DATED | : May 13, 2014 |
| INVENTOR(S) | : Arunprasad Ramiya Mothilal |

It is certified that error appears in the above-identified patent and that said Letters Patent is hereby corrected as shown below:

In the Claims

At col 14, lines 30–31 (claim 13, lines 2–3),
   "active, wherein and the controller"

should read:
   -- active, and wherein the controller --

Signed and Sealed this
Twenty-ninth Day of July, 2014

Michelle K. Lee
*Deputy Director of the United States Patent and Trademark Office*